(12) United States Patent
Pan et al.

(10) Patent No.: US 11,856,387 B2
(45) Date of Patent: Dec. 26, 2023

(54) VIDEO CONFERENCING SYSTEM AND METHOD THEREOF

(71) Applicant: AVer Information Inc., New Taipei (TW)

(72) Inventors: Ching-Yuan Pan, New Taipei (TW); Fu-En Tsai, New Taipei (TW); Chen-Chu Chang, New Taipei (TW)

(73) Assignee: AVer Information Inc., New Taipei (TW)

( * ) Notice: Subject to any disclaimer, the term of this patent is extended or adjusted under 35 U.S.C. 154(b) by 8 days.

(21) Appl. No.: 17/580,619

(22) Filed: Jan. 20, 2022

(65) Prior Publication Data

US 2022/0240042 A1 Jul. 28, 2022

(30) Foreign Application Priority Data

Jan. 22, 2021 (TW) ................. 110102548

(51) Int. Cl.
| | |
|---|---|
| *H04S 7/00* | (2006.01) |
| *H04R 1/08* | (2006.01) |
| *H04N 7/15* | (2006.01) |
| *H04N 23/69* | (2023.01) |
| *H04N 23/611* | (2023.01) |

(52) U.S. Cl.
CPC ............... *H04S 7/303* (2013.01); *H04N 7/15* (2013.01); *H04N 23/611* (2023.01); *H04N 23/69* (2023.01); *H04R 1/08* (2013.01)

(58) Field of Classification Search
CPC ........ H04N 23/69; H04N 23/611; H04N 7/15; H04R 1/08; H04S 7/303

USPC .............................................. 348/14.02–14.9
See application file for complete search history.

(56) References Cited

U.S. PATENT DOCUMENTS

| 1,013,441 | A | 1/1912 | Reagin | |
|---|---|---|---|---|
| 2012/0327177 | A1* | 12/2012 | Kee | .......................... H04N 7/15 |
| | | | | 348/E7.083 |
| 2019/0313031 | A1* | 10/2019 | Zhang | .................. G06V 40/161 |

FOREIGN PATENT DOCUMENTS

| CN | 111263106 A | 6/2020 |
|---|---|---|
| CN | 111343411 A | 6/2020 |
| CN | 111918018 A | 11/2020 |

* cited by examiner

*Primary Examiner* — Maria El-Zoobi
(74) *Attorney, Agent, or Firm* — CKC & Partners Co., LLC

(57) ABSTRACT

A video conferencing system is provided, which includes at least one camera device, a microphone array device, a sound output device, and a processor. The processor is configured to: receive multiple image signals converted by an image shot by the at least one camera device, and receive multiple voice signals converted from multiple voices captured from the microphone array device; and select at least one sound source signal corresponding to multiple personnel positions from the multiple sound signals according to the image signal and the multiple voice signals, so as to transmit at least one sound source signal corresponding to the multiple personnel positions to the sound output device, where the sound output device converts at least one sound source signal into sound for play. In addition, a video conferencing method is also disclosed herein.

20 Claims, 6 Drawing Sheets

VIDEO CONFERENCING SYSTEM AND METHOD THEREOF

CROSS-REFERENCE TO RELATED APPLICATION

This application claims priority to Taiwan Application Serial Number 110102548, filed Jan. 22, 2021, which is herein incorporated by reference in its entirety.

BACKGROUND

Field of Disclosure

The present disclosure relates to a video conferencing system and method thereof.

Description of Related Art

In order to fulfill demand for a wide coverage area of voice pickup, when a video conference is required, various devices for conducting a video conference are usually equipped with various high-sensitivity microphones. However, without limitation of preset coverage area of voice pickup, the high-sensitivity microphone can not only perform 360-degree voice pickup to capture voices of participants, but also causes various problems, such as capturing noises of various non-participants. Therefore, this often causes troubles for participants in the video conference remotely.

SUMMARY

The disclosure provides a video conference system and method thereof, which can eliminate various noises of non-participants in a video conference.

According to the first aspect, a video conferencing system is provided. The video conferencing system comprises at least one camera device, a microphone array device, a sound output device and a processor. At least one camera device is configured to photograph an image and convert the image into an image signal for output; a microphone array device comprises a plurality of microphones, and is configured to capture a plurality of personnel voices and convert the plurality of personnel voices into a plurality of voice signals for output; a sound output device is configured to play sound; and a processor is connected to the at least one camera device, the microphone array device and the sound output device, and configured to: receive the image signal from the at least one camera device, and receive the plurality of voice signals from the microphone array device; and select at least one sound source signal corresponding to a plurality of personnel positions from the plurality of voice signals according to the image signal and the plurality of voice signals, so as to transmit the at least one sound source signal corresponding to the plurality of personnel positions to the sound output device, wherein the sound output device converts the at least one sound source signal into sound for play.

According to the second aspect, a video conferencing method is provided. The video conferencing method comprises: using at least one camera device to photograph an image, and convert the image into an image signal for output; using a microphone array device to capture a plurality of personnel voices, and converting the plurality of personnel voices into a plurality of voice signals for output; identifying shooting range information corresponding to a plurality of personnel positions according to the image signal, and identifying sound source position information according to the plurality of voice signals; selecting at least one sound source signal corresponding to the plurality of personnel positions from the plurality of voice signals according to the shooting range information and the sound source position information; and using a sound output device to convert the at least one sound source signal into sound for play.

According to the third aspect, a video conferencing system is provided. The video conferencing system comprises a sound output device, at least one camera device, a microphone array device and a processor. At least one camera device is configured to photograph an image and convert the image into an image signal for output; a microphone array device comprises a plurality of microphones, and is configured to capture a plurality of personnel voices and convert the plurality of personnel voices into a plurality of voice signals for output; a processor is connected to the at least one camera device, the microphone array device and the sound output device, and configured to: receive the image signal from the at least one camera device, and receive the plurality of voice signals from the microphone array device; generate a shooting range according to the image signal, and generate a plurality of sound source positions according to the plurality of voice signals, so as to determine whether the plurality of sound source positions are located in the shooting range; select at least one sound source signal corresponding to the sound source position located in the shooting range from the plurality of voice signals to transmit the at least one sound source signal to the sound output device if at least one of the plurality of sound source positions is located in the shooting range, wherein the sound output device converts the at least one sound source signal into an output sound for play.

Based on the above, the video conferencing system and method thereof of the present disclosure utilizes a camera device based on smart framing technology to bring participants into the field of view of the camera device. In this way, combining this camera device with a microphone array device based on audio tracking technology can automatically limit a coverage area of voice pickup, so as to avoid picking up the noise of non-participants.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
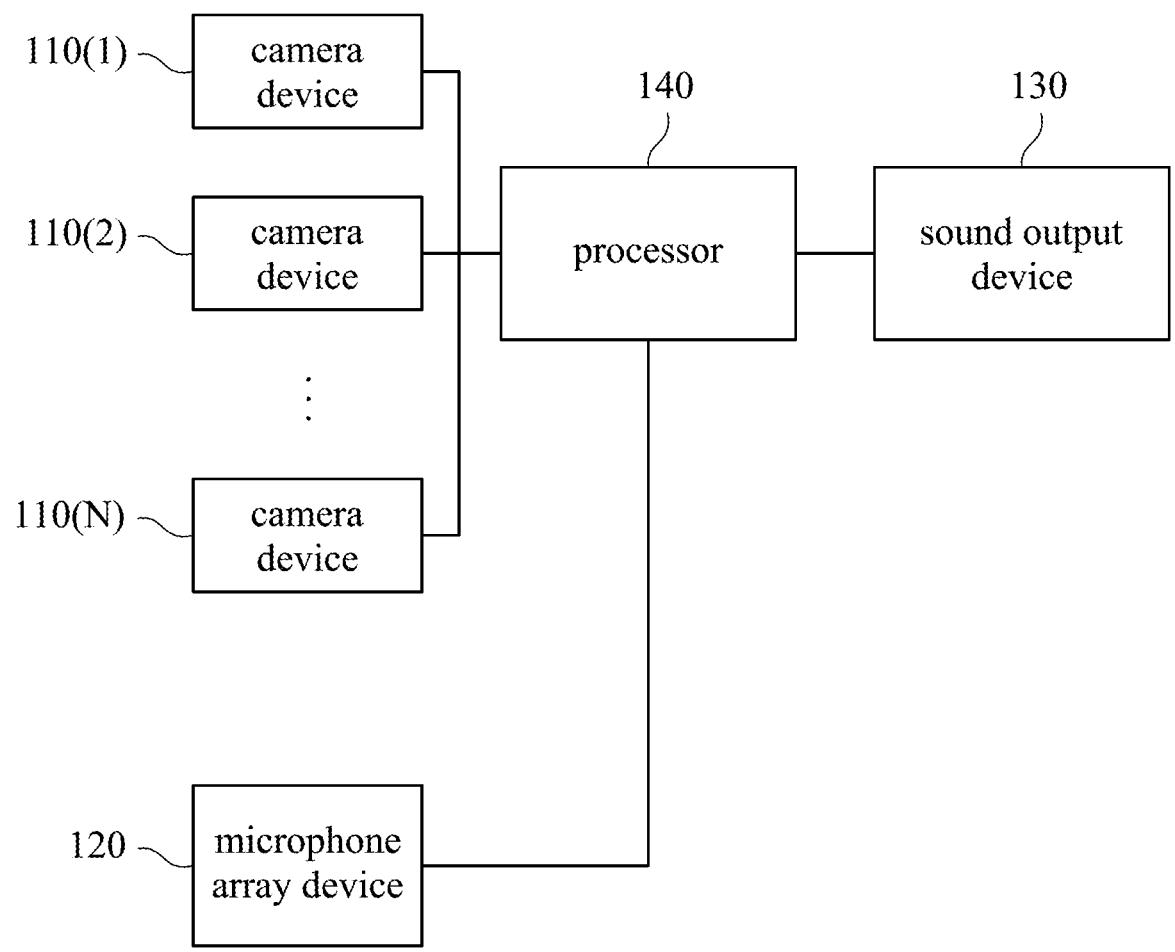
FIG. 1 is a block diagram of a video conferencing system according to some exemplary embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a block diagram of a video conferencing system according to some exemplary embodiments of the present disclosure. Referring to FIG. 1, the video conferencing system 100 of this embodiment includes at least one camera device 110(1) to 110(N), a microphone array device 120, a sound output device 130, and a processor 140, where N can be any positive integer, and there is no special restriction. The video conferencing system 100 can be applied to online video conferences, online call conferences, or general conferences (multiple personnel can participate in the above-mentioned conferences) in a conference room for voice pickup, and there is no particular limitation.

Further, the camera devices 110(1) to 110(N) can photograph images and convert the images into image signals for output. The microphone array device 120 can include multiple microphones (not shown), and capture multiple personnel voices, and convert the multiple personnel voices into multiple voice signal for output, where a quantity of the multiple microphones can be any positive integer, and there is no particular limitation. The sound output device 130 can play a sound. The processor 140 can be respectively connected to the camera devices 110(1) to 110(N), the microphone array device 120 and the sound output device 130 in a wired or wireless method.

For the wired method, the above-mentioned connected method can be through universal serial bus (USB), RS232, universal asynchronous receiver/transmitter (UART), internal integration Circuit (I2C), serial peripheral interface (SPI), display port (display port), thunderbolt (thunderbolt) or local area network (LAN) interface connected method, and there is no particular limitation. For the wireless method, the above-mentioned connected method can be through wireless fidelity (Wi-Fi) module, radio frequency identification (RFID) module, Bluetooth module, infrared radiation (IR) module, near-field communication (NFC) module or device-to-device (D2D) module connected method, and there is no particular limitation.

In some embodiments, the camera devices 110(1) to 110(N) are, for example, cameras having a charge coupled device (CCD) camera lens, a complementary metal oxide semiconductor (CMOS) camera lens, an infrared camera lens, or other element camera lens, etc.

In some embodiments, the camera devices 110(1) to 110(N) can be set at any position in the conference room. In further embodiments, if N=1, the camera device 110(1) is, for example, a pan tilt zoom (PTZ) camera with the above-mentioned camera lens. In addition, if N=2, the camera device 110(1) is, for example, a pan tilt zoom camera with the above-mentioned camera lens, and the camera device 110(2) is, for example, a wide-angle lens camera (e.g., a 180-degree wide-angle lens camera) of the above-mentioned various camera lenses with wide-angle lenses.

In some embodiments, the microphone array device 120 can also be located at any position in the conference room. In addition, the multiple microphones of the microphone array device 120 are, for example, microphones with multiple microphone receiving units, where the microphone receiving units can be omnidirectional microphones or directional microphones, and can respectively capture multiple voices in different directions.

In some embodiments, the sound output device 130 can be located in any position of the conference room, another conference room or office etc., which are indoor or outdoor spaces where any personnel participating in an online conference. In addition, the sound output device 130 is, for example, an electronic device such as a mobile phone, a personal computer (PC), a tablet computer, a mobile phone, and a personal digital assistant (PDA) having various speakers such as a piezoelectric speaker or a dynamic speaker.

In some embodiments, the processor 140 is, for example, in the above-mentioned various electronic devices, a central processing unit (CPU), or other programmable general-purpose or special-purpose micro control unit (MCU), microprocessor, digital signal processor (DSP), programmable controller, application specific integrated circuit (ASIC), graphics processing unit (GPU), arithmetic logic unit (ALU), complex programmable logic device (CPLD), field programmable gate array (FPGA) or other similar components or combinations of the above components.

Figure 2:
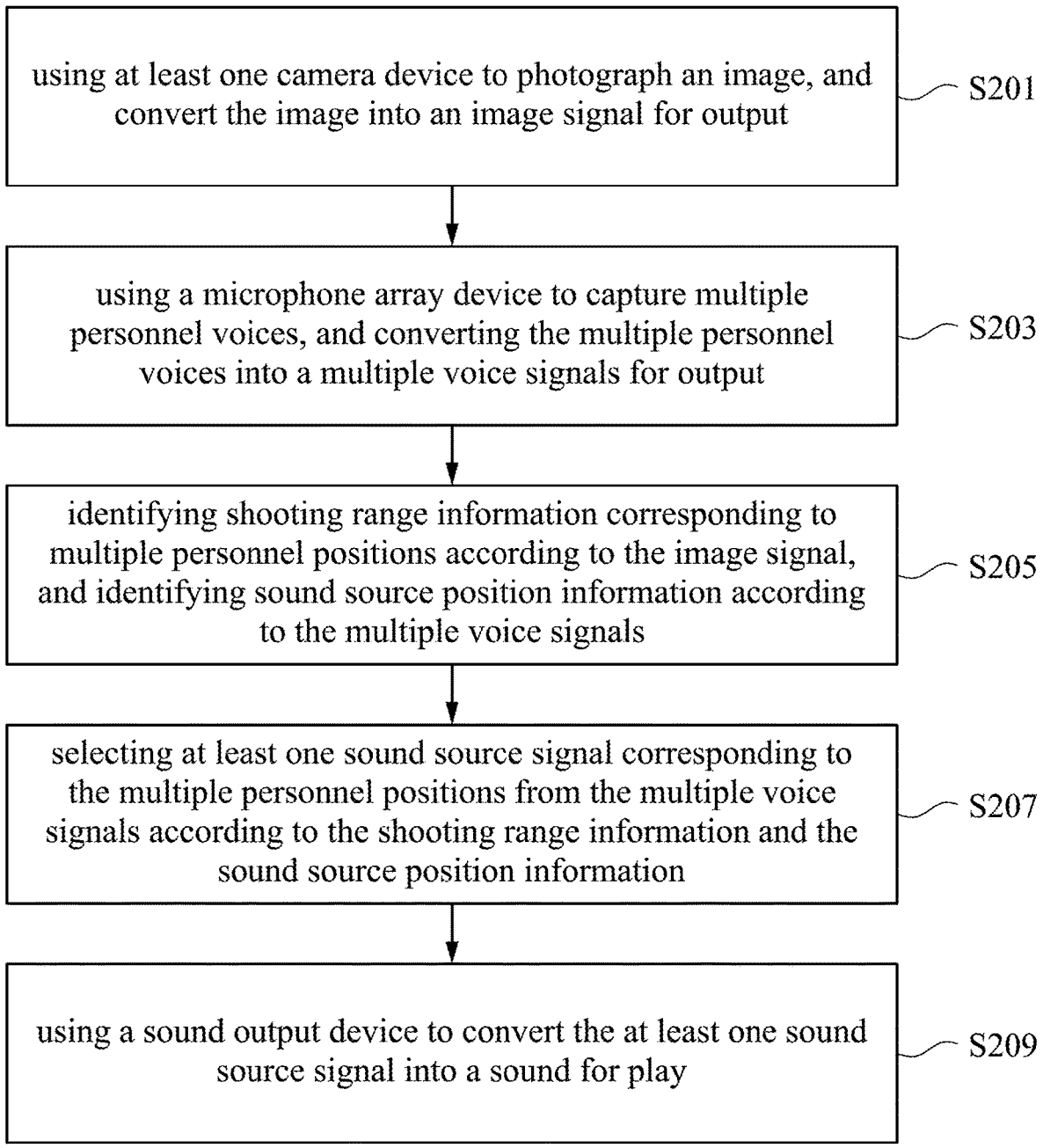
FIG. 2 is a flowchart of a video conferencing method according to some exemplary embodiments of the present disclosure.

FIG. 2 is a flowchart of a video conferencing method according to some exemplary embodiments of the present disclosure. The method of the embodiment shown in FIG. 2 is applicable to the video conferencing system 100 in FIG. 1, but is not limited to this. For the sake of convenience and clear description, the detailed steps of the video conferencing method shown in FIG. 2 can be described in the following with reference to FIG. 1 and FIG. 2 at the same time.

First, in step S201, at least one of the camera devices 110(1) to 110(N) can photograph an image, and convert the image into an image signal for output. In detail, at least one of the camera devices 110(1) to 110(N) can photograph the conference room to generate the image of the conference room, and further convert the image of the conference room into the image signal for output, where all or some of the multiple personnel participating in the conference can be located in the conference room, and there is no special restriction on a number of multiple personnel. Further, at least one of the camera devices 110(1) to 110(N) can convert the image of the conference room incident through the camera lens into an electrical signal for output, and there is no particular limitation on the method of converting the image into the electrical signal.

Next, in step S203, the microphone array device 120 can capture the multiple personnel voices, and convert the personnel voices into multiple voice signals for output. In detail, the multiple microphones in the microphone array device 120 can respectively receive the multiple personnel voices in the conference room, and further convert the multiple personnel voices in the conference room into the multiple voice signals for output, where the multiple personnel voices can be made by at least one of the multiple personnel in the conference room. Further, the multiple microphones in the microphone array device 120 can convert, through various possible acoustic-electric conversion elements, the multiple personnel voices which are received in the conference room into multiple electrical signals for output, and there are no special restrictions on the above-mentioned acoustic-electric conversion method.

Next, in step S205, the processor 140 can identify shooting range information corresponding to multiple personnel positions according to the image signal, and identify sound source position information according to the multiple voice signals. In detail, the processor 140 can identify, from the image signal, at least one shooting angle corresponding to the camera devices 110(1) to 110(N), so as to identify the sound source position information according to the at least one shooting angle. In addition, the processor 140 can identify, from the multiple voice signals, the sound source position information of multiple sound source positions corresponding to the multiple personnel voices. In some embodiments, both the shooting range information and the sound source position information can be represented in the form of indoor two-dimensional coordinates of the conference room.

In some embodiments, at least one of the camera devices 110(1) to 110(N) can photograph the images according to multiple shooting angles to convert the images into the image signals, and adjust the shooting angle corresponding to at least one of the camera devices 110(1) to 110(N) according to the image signals. Taking N=1 as an example, the camera devices 110(1) can photograph the images according to the multiple shooting angles to convert the images into the image signals, and adjust the shooting angle corresponding to the camera device 110(1) according to the image signals.

In other embodiments, at least one of the camera devices 110(1) to 110(N) can photograph the image to convert the image into an image signal, and at least another one of the camera devices 110(1) to 110(N) can adjust the shooting angle corresponding to the at least another one of the camera devices 110(1) to 110(N) according to the image signal. Taking N=2 as an example, the camera device 110(1) can photograph the image to convert the image into an image signal. The camera device 110(2) can adjust the shooting angle corresponding to the camera device 110(2) according to the image signal.

In some embodiments, the processor 140 can identify personnel position information of multiple personnel positions from the image signal, and generate multiple shooting setting parameters of at least one of the camera devices 110(1) to 110(N) according to the personnel position information, and generates the shooting range information corresponding to the multiple personnel positions according to the multiple shooting setting parameters.

In some embodiments, the processor 140 can use sound source tracking or sound source localization methods (e.g., beamforming, super-resolution spectrum estimation, TDOA, CICS, there is no limit here) to generate the sound source position information corresponding to the multiple voice signals according to the multiple voice signals.

Next, in step S207, the processor 140 can select at least one sound source signal corresponding to the personnel positions from the multiple voice signals according to the shooting range information and the sound source position information. In detail, the processor 140 can determine whether the multiple sound positions corresponding to the sound source position information match the at least one shooting angle corresponding to the camera devices 110(1) to 110(N). In this way, the processor 140 can transmit all voice signals matching the at least one shooting angle corresponding to the camera devices 110 (1) to (N) to the sound output device 130.

In some embodiments, the processor 140 and the sound output device 130 can be located in the same or different electronic devices in the same conference room, or located in different electronic devices in different conference rooms or offices, and the processor 140 can transmit all voice signals matching the at least one shooting angle corresponding to the camera devices 110 (1) to (N) to the audio output device 130 through various wired or wireless methods.

In some embodiments, the processor 140 can determine whether the multiple sound source positions corresponding to the sound source position information are located in a shooting range corresponding to the shooting range information. If at least one of the multiple sound source positions is located in the shooting range, the processor 140 can select the at least one sound source signal corresponding to sound source positions in the shooting range from the multiple voice signals, and transmit the at least one sound source signal to the sound output device 130. If none of the multiple sound source positions are located in the shooting range, the processor 140 can generate and transmit a comfort noise signal to the sound output device 130.

Finally, in step S209, the sound output device 130 can convert the at least one sound source signal into a sound for play. In detail, the sound output device 130 can perform electro-acoustic conversion on all sound source signals received from the processor 140 to generate the sound, and then play the sound. In some embodiments, the sound output device 130 and the processor 140 can be located in the same or different electronic devices in the conference room, and the sound output device 130 can store all the sound source signals transmitted from the processor 140. the sound output device 130 can convert the stored sound source signal into the sound to play when at least one of the multiple personnel participating in the conference wants to listen to an audio conference record.

In other embodiments, the sound output device 130 can be located in the electronic device in another conference room or office, and can convert all the received sound source signals corresponding to the conference room into the sound to be played to all personnel participating in the conference in another conference room or office.

Through the above steps, the video conferencing system 100 of the embodiment of the present disclosure can instantly capture the voices of all personnel participating in the conference, and prevent capturing all the voices of personnel who are not participating in the conference (for example, those who pass through the conference room or those who deliver documents, etc.). In this way, the efficiency of voice pickup of the video conference can be improved.

Further, the following describes a usage scenario of the video conferencing system 100 according to an embodiment of the present disclosure. Taking a single camera device as an example, the single camera device of the video conferencing system 100 can be located at any position in the conference room where the multiple personnel exist.

Figure 3:
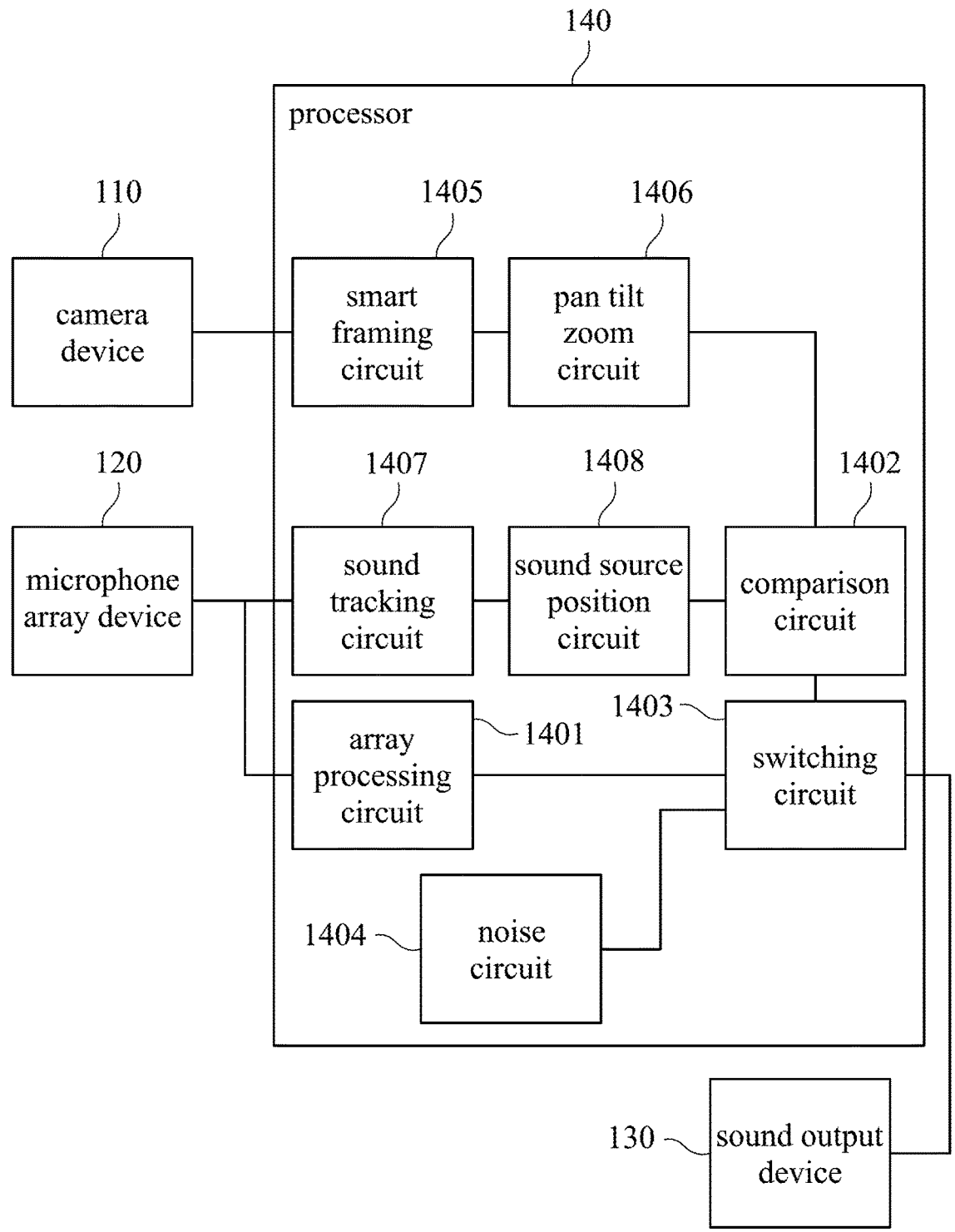
FIG. 3 is a schematic diagram of a video conferencing system with a single camera device according to other exemplary embodiments of the present disclosure.

For example, FIG. 3 is a schematic diagram of the video conferencing system with the single camera device according to other exemplary embodiments of the present disclosure. Referring to FIG. 3, the video conferencing system 300 can include a camera device 110, a microphone array device 120, a sound output device 130, and a processor 140. The processor 140 can be respectively connected to the camera device 110, the microphone array device 120, and the sound output device 130 in the wired or wireless method.

In some embodiments, the camera device 110 can be a pan tilt zoom camera, and the microphone array device 120 can be an array microphone.

In some embodiments, the processor 140 can include an array processing circuit 1401, a comparison circuit 1402, a switching circuit 1403, a noise circuit 1404, a smart framing circuit 1405 using smart framing technology, a pan tilt zoom circuit 1406, a sound tracking circuit 1407 and a sound source position circuit 1408 using sound tracking technology.

In a further embodiment, the smart frame circuit 1405 can be connected to the comparison circuit 1402 via the pan tilt zoom circuit 1406. The sound tracking circuit 1407 can be connected to the comparison circuit 1402 via the sound source position circuit 1408. The array processing circuit 1401, the comparison circuit 1402, and the noise circuit 1404 can be connected to the switching circuit 1403.

It is worth noting that all the above circuits can also be implemented by various software or firmware, and there is no particular limitation.

Figure 4:
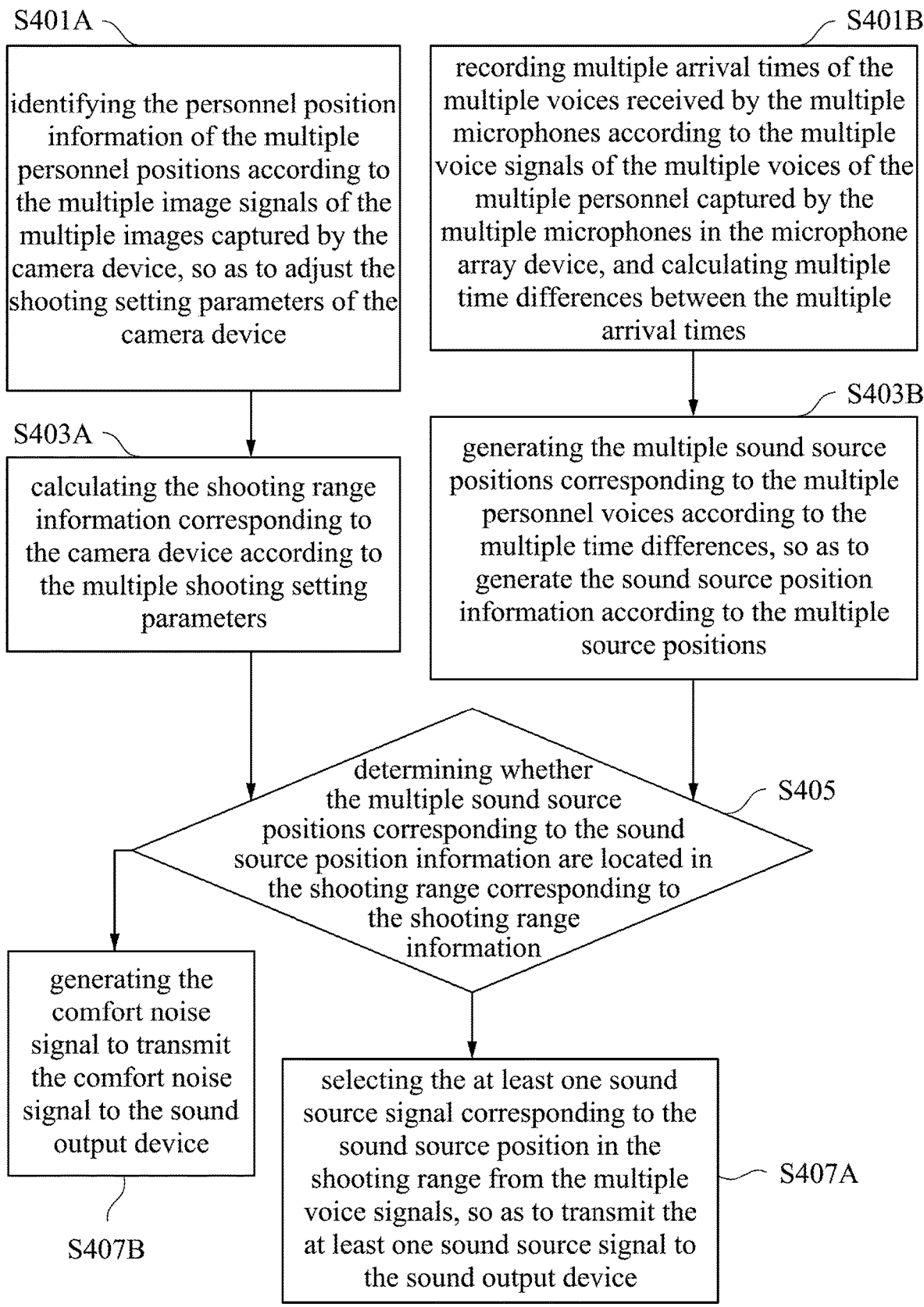
FIG. 4 is a flowchart of a video conferencing method for the single camera device according to other exemplary embodiments of the present disclosure.

FIG. 4 is a flowchart of a video conferencing method for the single camera device according to other exemplary embodiments of the present disclosure. Refer to FIG. 3 and FIG. 4 at the same time. First, in step S401A, the processor 140 can identify the personnel position information of the multiple personnel positions according to the multiple image signals of the multiple images captured by the camera device 110, so as to adjust the shooting setting parameters of the camera device 110.

In detail, the camera device 110 can photograph the images according to all horizontal angles (i.e., horizontal 360-degree image capture) to convert the images into the image signals. The processor 140 receives the image signals, and uses the smart framing technology to generate the personnel position information of the multiple personnel positions according to the image signals. In this way, the processor 140 can adjust the multiple shooting setting parameters of the camera device 110, and use the camera device 110 to adjust the shooting angle corresponding to the camera device 110 according to the multiple shooting setting parameters. In some embodiments, the multiple shooting setting parameters can include parameters of the horizontal angles and the elevation angles of the camera device 110. In some embodiments, the personnel position information can also be expressed in the form of indoor two-dimensional coordinates of multiple personnel in the conference room.

Further, the processor 140 can integrate the image signals of all the captured images into a wide-angle image signal of a wide-angle image. In this way, the processor 140 can determine the positions of all persons participating in the conference in the conference room based on the wide-angle image signal. In this way, the processor 140 can identify positions of all the personnel participating in the conference in the conference room according to the wide-angle image signal. In order to capture all the personnel participating in the conference in the conference room, the processor 140 can generate the multiple shooting setting parameters of the camera device 110 according to the multiple identified personnel positions, and can use the camera device 110 to adjust the shooting angle corresponding to the camera device 110 according to the shooting setting parameters (i.e., the camera device 110 can photograph all personnel participating in the conference at this angle).

In some embodiments, the camera device 110 can photograph according to all horizontal angles, and the smart framing circuit 1405 of the processor 140 can integrate all the captured images to generate the wide-angle image. In addition, the smart framing circuit 1405 can perform face detection, human shape detection and motion detection on the wide-angle image to generate the personnel position information of the multiple personnel positions, and can perform partial image enlargement on the wide-angle image according to the personnel position information to generate multiple partial enlargement parameters.

In this way, the smart framing circuit 1405 can generate the multiple shooting setting parameters of the camera device 110 according to these partial enlargement parameters. The pan tilt zoom circuit 1406 can receive these shooting setting parameters, and use the camera device 110 to adjust the shooting angle corresponding to the camera device 110 according to these shooting setting parameters.

In step S401B, the processor 140 can record multiple arrival times of the multiple voices received by the multiple microphones according to the multiple voice signals of the multiple voices of the multiple personnel captured by the multiple microphones in the microphone array device 120, and calculate multiple time differences between the multiple arrival times.

In some embodiments, when any microphone receives the personnel voice, the sound tracking circuit 1407 of the processor 140 can immediately record the arrival time of the personnel voice. In this way, the sound tracking circuit 1407 can calculate the multiple time differences between the multiple arrival times corresponding to the multiple personnel voices.

Next, in step S403A, the processor 140 can calculate the shooting range information corresponding to the camera device 110 according to the multiple shooting setting parameters.

In some embodiments, the pan tilt zoom circuit 1406 of the processor 140 can calculate the shooting angle corresponding to the camera device 110 according to the multiple shooting setting parameters. In this way, the pan tilt zoom circuit 1406 can calculate the shooting range in the conference room according to the shooting angle to generate the shooting range information.

In step S403B, the processor 140 can generate the multiple sound source positions corresponding to the multiple personnel voices according to the multiple time differences, so as to generate the sound source position information according to the multiple source positions.

In some embodiments, the sound source position circuit 1408 of the processor 140 can generate, by a sound tracking technology, the multiple sound source positions corresponding to the multiple personnel voices according to the multiple time differences between the above-mentioned multiple arrival times to generate the sound source position information according to the multiple sound source positions.

Next, in step S405, the processor 140 can determine whether the multiple sound source positions corresponding to the sound source position information are located in the shooting range corresponding to the shooting range information. If at least one of the multiple sound source positions is located in the shooting range, it enters to step S407A. In addition, if the multiple sound sources are not in the shooting range, it enters to step S408A.

In some embodiments, the comparison circuit 1402 of the processor 140 can extract the multiple sound source positions from the sound source position information, and extract the multiple shooting ranges corresponding to the multiple personnel positions from the shooting range information. In this way, the comparison circuit 1402 can determine whether the multiple sound source positions corresponding to the sound source position information are located in the shooting range corresponding to the shooting range information. In some embodiments, the shooting range corresponding to the multiple personnel positions can also be expressed in the form of indoor two-dimensional coordinates of the multiple personnel in the conference room.

In some embodiments, steps S401A to S403A and steps S401B to S403B may not be used. Thus, the processor 140 can use any sound source tracking method to generate the sound source position information according to the multiple voice signals, and can directly generates the shooting range information according to the multiple image signals or the current shooting setting parameters (which have not been adjusted in step S401A). In this way, the processor 140 can determine whether the multiple sound source positions corresponding to the sound source position information are located in the shooting range corresponding to the shooting range information. In other words, the processor 140 can directly identify which sound source positions exist in the current shooting range.

Accordingly, in step S407A, the processor 140 can select the at least one sound source signal corresponding to the sound source position in the shooting range from the multiple voice signals, so as to transmit the at least one sound source signal to the sound output device 130. Then, in step S407B, the processor 140 can generate the comfort noise signal to transmit the comfort noise signal to the sound output device 130.

In some embodiments, the switching circuit 1403 of the processor 140 can receive the multiple voice signals from the microphone array device 120 via the array processing circuit 1401, and can select the at least one sound source signal corresponding to the sound source position in the shooting range from the multiple voice signals. In this way, the switching circuit 1403 transmits the at least one sound source signal to the sound output device 130.

In other embodiments, the switching circuit 1403 of the processor 140 can receive the comfort noise signal from the noise circuit 1404. In this way, the switching circuit 1403 transmits the comfort noise signal to the sound output device 130.

Through the above steps, the video conferencing system 300 of the embodiment of the present disclosure can perform the smart framing technology through the single camera device 110 and perform the sound tracking technology through the microphone array device 120 to capture the voices of all the personnel participating in the conference instantly, and prevent all the voices of personnel who are not participating in the conference from being captured, thereby improving the efficiency of the voice pickup of the video conference.

Further, the following describes another usage scenario of the video conferencing system 100 of FIG. 1 according to the embodiment of the present disclosure. Taking two camera devices as an example, the two camera devices of the video conferencing system 100 of FIG. 1 can be located at any position in the conference room where the multiple personnel exist.

Figure 5:
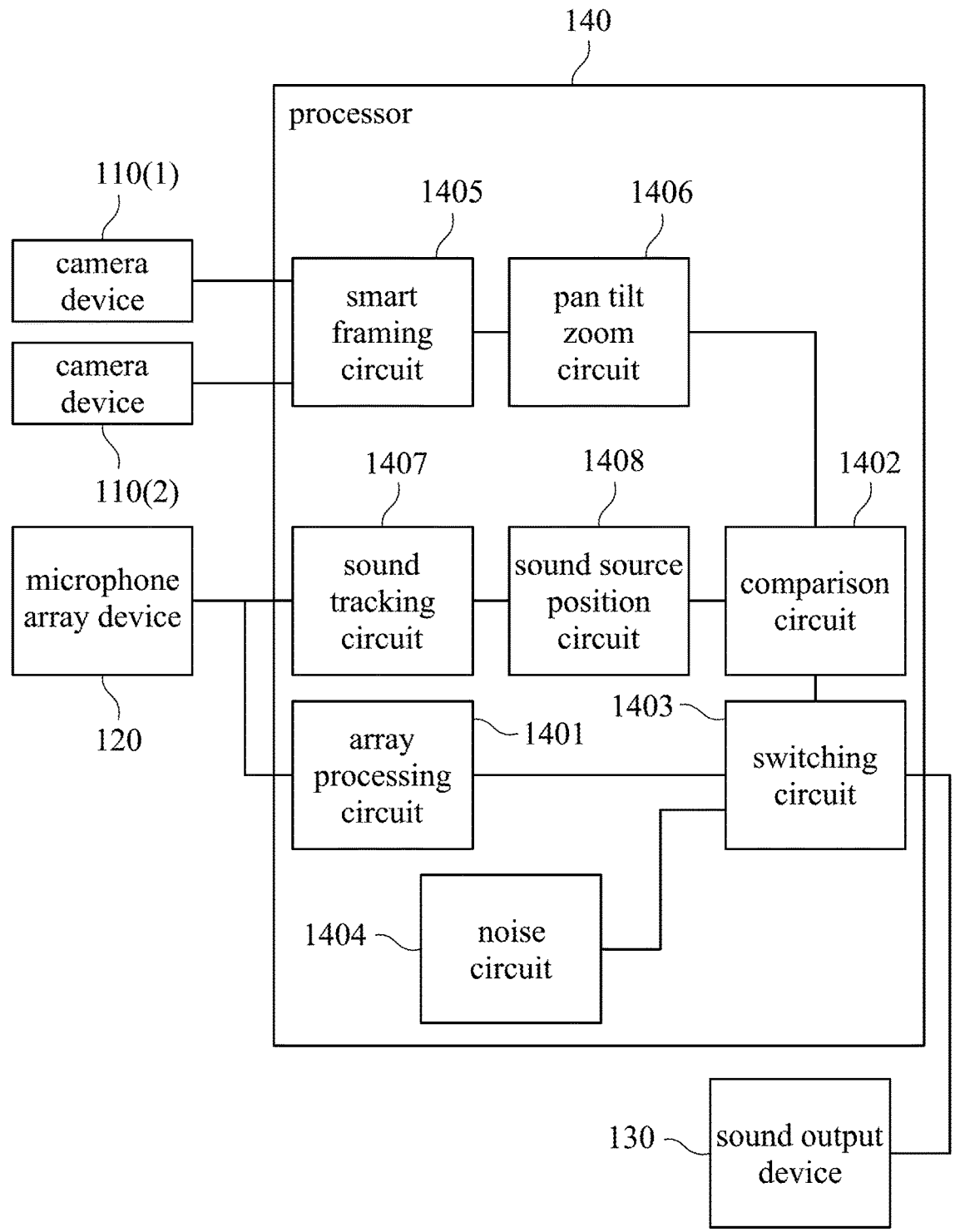
FIG. 5 is a schematic diagram of a video conferencing system with two camera devices according to other exemplary embodiments of the present disclosure.

For example, FIG. 5 is a schematic diagram of the video conferencing system with two camera devices according to other exemplary embodiments of the present disclosure. Referring to FIG. 5, the video conferencing system 500 can include camera devices 110(1) to 110(2), a microphone array device 120, a sound output device 130, and a processor 140. The processor 140 can be respectively connected to the camera device 110(1) to 110(2), the microphone array device 120, and the sound output device 130 in the wired or wireless method.

Compared with the embodiment shown in FIG. 3, the video conferencing system 500 in FIG. 5 further includes a second camera device (i.e., the camera device 110(2)). In addition, the camera device 110(1) can be the wide-angle lens camera having the camera lens with the wide-angle lens, and the camera device 110(2) can be the pan tilt zoom camera, and there is no particular limitation on the camera devices 110(1) to 110(2).

Figure 6:
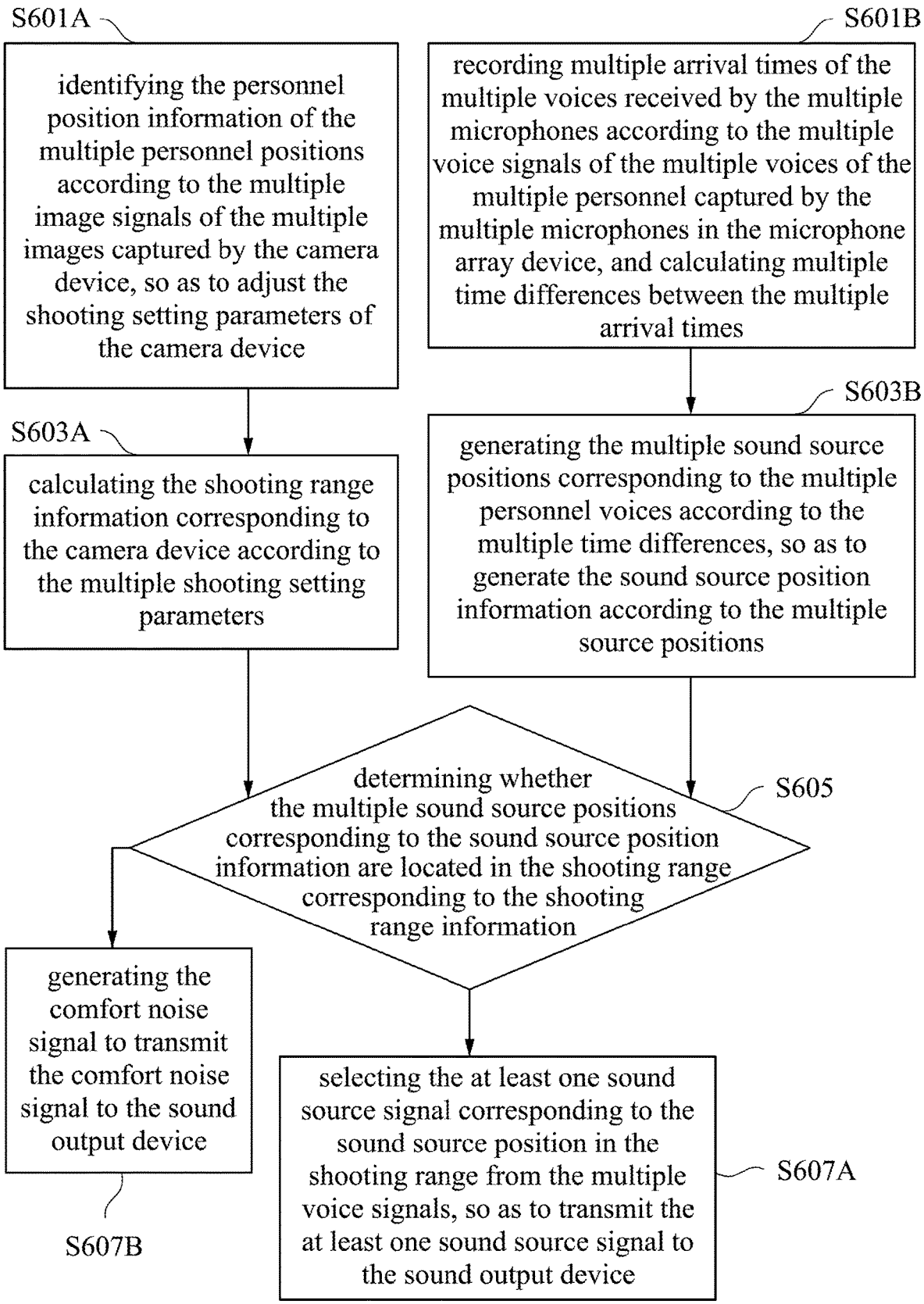
FIG. 6 is a flowchart of a video conferencing method for the two camera devices according to other exemplary embodiments of the present disclosure.

FIG. 6 is a flowchart of a video conferencing method for the two camera devices according to other exemplary embodiments of the present disclosure. Refer to FIG. 5 and FIG. 6 at the same time. Compared with the embodiment shown in FIG. 4, steps S601B~S603B, S603~S605, S607A~S607B in FIG. 6 are the same as steps S401B~S403B, S403~S405, S407A~S407B in FIG. 4, so it does not describe here again. Based on this, the following further describes the different steps in FIG. 6 compared to FIG. 4 (i.e., steps S601A to S603A).

First, in step S601A, the processor 140 can identify the personnel position information of the multiple personnel positions according to the multiple image signals of the multiple images captured by the camera device 110(1), so as to adjust the shooting setting parameters of the camera device 110(2).

In detail, the camera device 110(1) can photograph wide-angle images to convert the wide-angle images into the image signals. The processor 140 receives the image signals, and uses the smart framing technology to generate the personnel position information of multiple personnel positions according to the image signal. In this way, the processor 140 can adjust the multiple shooting setting parameters of the camera device 110(2), and use the camera device 110(2) to adjust the shooting angle corresponding to the camera device 110(2) according to the multiple shooting setting parameters. In some embodiments, the multiple shooting setting parameters can include parameters of shooting horizontal angle and shooting vertical angle of the camera device 110(2). In some embodiments, the personnel position information can also be expressed in the form of indoor two-dimensional coordinates of the multiple personnel in the conference room.

Further, the processor 140 can identify the positions of all the personnel participating in the conference in the conference room according to the wide-angle video signals. In order to photograph all the personnel participating in the conference in the conference room, the processor 140 can generate multiple shooting setting parameters of the camera device 110(2) according to the identified personnel positions, and can use the camera device 110(2) to adjust the shooting angle corresponding to the camera device 110(1) according to these shooting setting parameters (i.e., the camera device 110(2) can photograph all personnel participating in the conference at this angle).

In some embodiments, the smart frame circuit 1405 of the processor 140 can perform face detection, human shape detection, and motion detection on the wide-angle images to generate the personnel position information of the multiple personnel positions, and can performs partial image enlargement on the wide-angle images according to the personnel position information to generate the multiple partial enlargement parameters.

In this way, the smart framing circuit 1405 can generate the multiple shooting setting parameters of the camera device 110(2) according to these partial enlargement parameters. The pan tilt zoom circuit 1406 can receive these shooting setting parameters, and use the camera device 110(2) to adjust the shooting angle corresponding to the camera device 110(2) according to the shooting setting parameters.

Next, in step S603A, the processor 140 can calculate the shooting range information corresponding to the camera device 110(2) according to the multiple shooting setting parameters.

In some embodiments, the pan tilt zoom circuit 1406 of the processor 140 can calculate the shooting angle corresponding to the camera device 110(2) according to the multiple shooting setting parameters. In this way, the pan tilt zoom circuit 1406 can calculate the shooting range in the conference room according to the shooting angle to generate the shooting range information.

Through the above steps, the video conferencing system 500 of the embodiment of the present disclosure can perform smart framing technology through the camera device 110(1) and the camera device 110(2), and can use the microphone array device 120 to perform sound tracking technology to capture the voices of all the personnel participating in the conference instantly, and prevent all the voices of personnel who are not participating in the conference from being captured, thereby improving the efficiency of the voice pickup of the video conference.

In summary, the video conferencing system and method of the present disclosure use the at least one camera device based on the smart frame technology to bring participants into the field of view of one of the at least one camera device. Thus, combining the at least one camera device with the microphone array device based on the sound tracking technology can automatically limit the range of the voice pickup of the microphone. Accordingly, the embodiment of the present disclosure can combine the at least one camera device and the array microphone device to prevent all voices of non-participants from being captured. In this way, the voices of all participants in the video conference can be captured instantly, so as to improve the efficiency of the voice pickup of the video conference.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A video conferencing system, comprising:
   at least one camera device configured to photograph an image and convert the image into an image signal for output;
   a microphone array device comprising a plurality of microphones, and configured to capture a plurality of personnel voices and convert the plurality of personnel voices into a plurality of voice signals for output;
   a sound output device configured to play a sound; and
   a processor connected to the at least one camera device, the microphone array device and the sound output device, and configured to:
   receive the image signal from the at least one camera device, and receive the plurality of voice signals from the microphone array device;
   identify shooting range information corresponding to a plurality of personnel positions according to the image signal, and identifying sound source position information according to the plurality of voice signals, wherein the shooting range information is generated by the processor based on indoor two-dimensional coordinates in a shooting field corresponding to a field of view of the at least one camera device; and
   select at least one sound source signal corresponding to the plurality of personnel positions from the plurality of voice signals according to the shooting range information and the sound source position information, so as to transmit the at least one sound source signal corresponding to the plurality of personnel positions to the sound output device,
   wherein the sound output device converts the at least one sound source signal into the sound for play.

2. The video conferencing system of claim 1, wherein the at least one camera device further configured to:
   photograph the image according to a plurality of shooting angles to convert the image into the image signal, and adjust a corresponding shooting angle of the camera device according to the image signal.

3. The video conferencing system of claim 1, wherein the at least one camera device comprises:
   a first camera device configured to photograph the image to convert the image into the image signal; and
   a second camera device configured to adjust a corresponding shooting angle of the second camera device according to the image signal.

4. The video conferencing system of claim 1, wherein the processor further configured to:
   identify personnel position information of the plurality of personnel positions from the image signal; and
   generate a plurality of shooting setting parameters of the at least one camera device according to the personnel position information, and generate the shooting range information corresponding to the plurality of personnel positions according to the plurality of shooting setting parameters.

5. The video conferencing system of claim 4, wherein the processor further configured to:
   generate, by sound tracking method or sound source localization method, sound source position information corresponding to the plurality of voice signals according to the plurality of voice signals;
   extract a plurality of sound source positions corresponding to the sound source position information; and
   select the at least one sound source signal corresponding to the sound source position located in a shooting range corresponding to the shooting range information from the plurality of voice signals according to the plurality of sound source positions corresponding to the sound source position information.

6. The video conferencing system of claim 5, wherein the processor further configured to:
   determine whether the plurality of sound source positions corresponding to the sound source position information are located in the shooting range corresponding to the shooting range information; and
   select the at least one sound source signal corresponding to a sound source position located in the shooting range from the plurality of voice signals if at least one of the plurality of sound source positions is located in the shooting range.

7. The video conferencing system of claim 6, wherein the shooting range information and the sound source position information are represented in form of indoor two-dimensional coordinates of a conference room.

8. A video conferencing method, comprising:
using at least one camera device to photograph an image, and convert the image into an image signal for output;
using a microphone array device to capture a plurality of personnel voices, and converting the plurality of personnel voices into a plurality of voice signals for output;
identifying shooting range information corresponding to a plurality of personnel positions according to the image signal, and identifying sound source position information according to the plurality of voice signals, wherein the shooting range information is generated based on indoor two-dimensional coordinates in a shooting field corresponding to a field of view of the at least one camera device;
selecting at least one sound source signal corresponding to the plurality of personnel positions from the plurality of voice signals according to the shooting range information and the sound source position information; and
using a sound output device to convert the at least one sound source signal into a sound for play.

9. The video conferencing method of claim 8, wherein the step of using the at least one camera device to photograph the image comprises:
using the camera device to photograph the image to convert the image into the image signal according to a plurality of shooting angles, and adjusting a corresponding shooting angle of the camera device according to the image signal.

10. The video conferencing method of claim 8, wherein the at least one camera device comprises a first camera device and a second camera device, wherein the first camera device configured to photograph the image to convert the image into the image signal, and the second camera device configured to adjust a corresponding shooting angle of the second camera device according to the image signal.

11. The video conferencing method of claim 8, wherein the step of identifying the shooting range information corresponding to the plurality of personnel positions according to the image signal comprises:
identifying personnel position information of the plurality of personnel positions from the image signal; and
generating a plurality of shooting setting parameters of the at least one camera device according to the personnel position information to generate the shooting range information corresponding to the plurality of personnel positions according to the plurality of shooting setting parameters.

12. The video conferencing method of claim 11, wherein the step of identifying the sound source position information according to the plurality of voice signals comprises:
generating, by sound tracking method or sound source localization method, sound source position information corresponding to the plurality of voice signals according to the plurality of voice signals;
extracting a plurality of sound source positions corresponding to the sound source position information; and
selecting the at least one sound source signal corresponding to the sound source position located in a shooting range corresponding to the shooting range information from the plurality of voice signals according to the plurality of sound source positions corresponding to the sound source position information.

13. The video conferencing method of claim 12, wherein the step of selecting the at least one sound source signal comprises:
determining whether a plurality of sound source positions corresponding to the sound source position information are located in a shooting range corresponding to the shooting range information; and
selecting the at least one sound source signal corresponding to the sound source position located in the shooting range from the plurality of voice signals if at least one of the plurality of sound source positions is located in the shooting range.

14. The video conferencing method of claim 8, wherein the shooting range information and the sound source position information are represented in form of indoor two-dimensional coordinates of a conference room.

15. A video conferencing system, comprising:
a sound output device;
at least one camera device configured to photograph an image and convert the image into an image signal for output;
a microphone array device comprising a plurality of microphones, and configured to capture a plurality of personnel voices and convert the plurality of personnel voices into a plurality of voice signals for output; and
a processor connected to the at least one camera device, the microphone array device and the sound output device, and configured to:
receive the image signal from the at least one camera device, and receive the plurality of voice signals from the microphone array device;
generate a shooting range according to the image signal, and generate a plurality of sound source positions according to the plurality of voice signals, so as to determine whether the plurality of sound source positions are located in the shooting range, wherein the shooting range is composed of indoor two-dimensional coordinates in a shooting field corresponding to a field of view of the at least one camera device; and
select at least one sound source signal corresponding to the sound source position located in the shooting range from the plurality of voice signals to transmit the at least one sound source signal to the sound output device if at least one of the plurality of sound source positions is located in the shooting range,
wherein the sound output device converts the at least one sound source signal into an output sound for play.

16. The video conferencing system of claim 15, wherein the at least one camera device further configured to:
photograph the image according to a plurality of shooting angles to convert the image into the image signal, and adjust a corresponding shooting angle of the camera device according to the image signal.

17. The video conferencing system of claim 15, wherein the at least one camera device comprises:
a first camera device configured to photograph the image to convert the image into the image signal; and
a second camera device configured to adjust a corresponding shooting angle of the second camera device according to the image signal.

18. The video conferencing system of claim 15, wherein the processor further configured to:
identify personnel position information of a plurality of personnel positions from the image signal; and
generate a plurality of shooting setting parameters of the at least one camera device according to the personnel position information, and generate shooting range information corresponding to the plurality of personnel positions according to the plurality of shooting setting parameters.

19. The video conferencing system of claim 15, wherein the processor further configured to:
generate, by sound tracking method or sound source localization method, sound source position information corresponding to the plurality of voice signals according to the plurality of voice signals;
extract the plurality of sound source positions corresponding to the sound source position information; and
select the at least one sound source signal corresponding to a sound source position located in the shooting range corresponding to shooting range information from the plurality of voice signals according to the plurality of sound source positions corresponding to the sound source position information.

20. The video conferencing system of claim 19, wherein the processor further configured to:
determine whether the plurality of sound source positions corresponding to the sound source position information are located in the shooting range corresponding to the shooting range information,
wherein the shooting range information and the sound source position information are represented in form of indoor two-dimensional coordinates of a conference room.

* * * * *